Sept. 11, 1956     J. L. R. CAILLOL     2,762,569
TEMPERATURE REGULATOR FOR SOLAR WATER HEATERS
Filed May 17, 1954
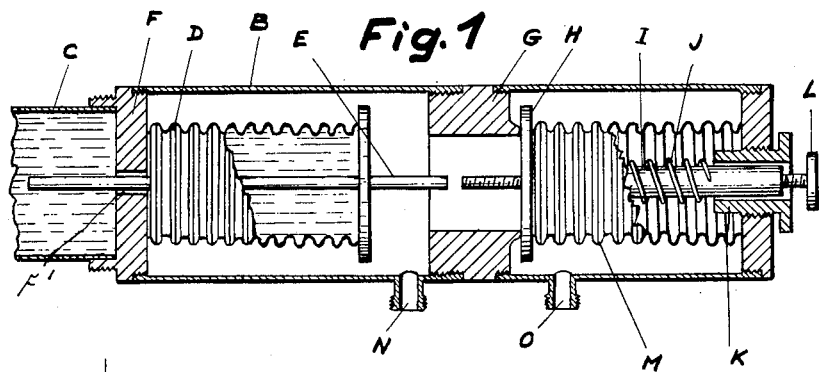
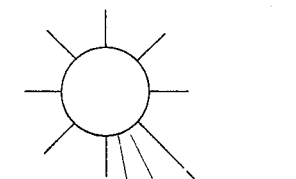
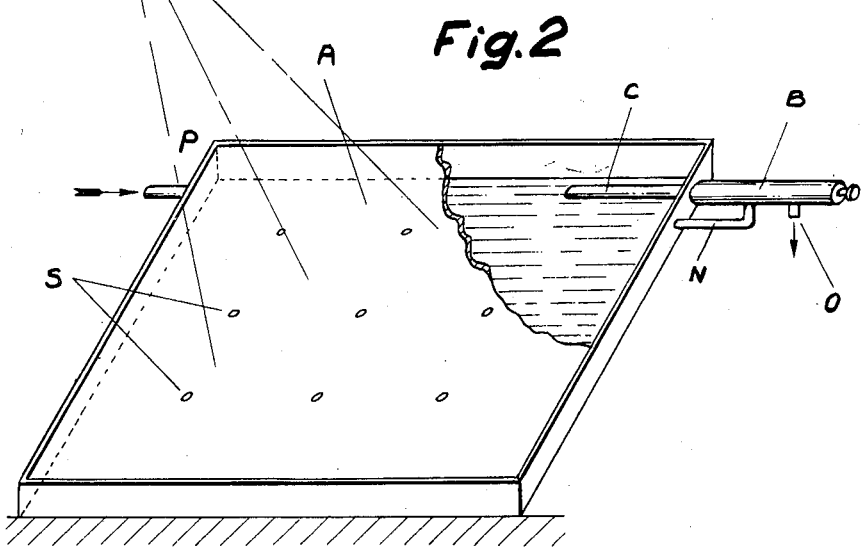
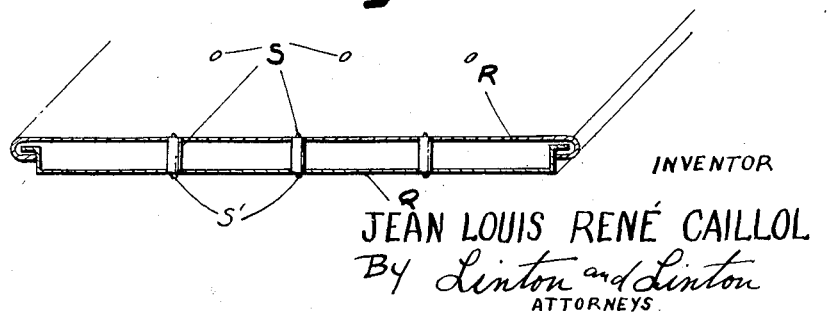
INVENTOR
JEAN LOUIS RENÉ CAILLOL
By Linton and Linton
ATTORNEYS United States Patent Office 2,762,569
Patented Sept. 11, 1956

2,762,569

TEMPERATURE REGULATOR FOR SOLAR WATER HEATERS

Jean Louis René Caillol, Nice, France

Application May 17, 1954, Serial No. 430,384

Claims priority, application France July 11, 1953

4 Claims. (Cl. 236—20)

I have invented certain new and useful improvements in a device for the automatic regulation of the temperature in the solar boilers of the "hollow-plate" type, of which the following is a description.

The present invention is directed to a new device for the automatic regulation of the temperature in the solar boilers of the "hollow-plate" type.

In the accompanying drawings disclosing one form of the invention;

Fig. 1 is a cross sectional view of the present automatic temperature regulating device.

Fig. 2 is a perspective view of a solar boiler of the "hollow-plate" type including said automatic temperature regulating device.

Fig. 3 is a cross sectional view of the solar boiler of Fig. 2.

Referring now more particularly to the accompanying drawing wherein like and corresponding parts are indicated by similar reference characters, A refers to a boiler formed by a flat rectangular box made of thin galvanized iron sheets and B is the cylindrical body of its automatic temperature regulating device.

C is a tube, closed at one end, extending from the body B between the interior walls of said boiler and containing an oily liquid with a high expansion coefficient.

D is an undulated membrane of an appropriate metal, extending from tube C and containing the same liquid. This membrane is in communication with tube C by means of holes F' provided through the piece F connecting tube C to body B and also connecting the same to said boiler.

E is an axial rod carried and operated by the membrane D and guided through the piece F.

G is a valve-seat against which valve H can be applied, the axial rod I of which is subjected to the action of spring J.

K is the guide for the valve and L is an adjusting screw extending through rod I of valve H from one end to the other thereof.

M is an undulated membrane of an appropriate metal, protecting hermetically rod I, guide K and spring J of valve H from contact with water.

N is a water pipe coming from boiler A, and O is a water outlet towards the exterior of body B with valve H controlling the flow therebetween.

P is a water inlet feeding boiler A.

Boiler A is composed of a flat rectangular vat Q made of thin galvanized iron sheet, provided with an edge on its four sides and a rectangular lid R, made of the same material, closing hermetically vat Q by means of folds enveloping the edge of the latter; these folds and this edge are mechanically clasped together and then welded with tin.

Braces S are provided between the principal walls of said boiler with rivets S' extending through said braces and connecting the same to said walls.

The working of the apparatus is as follows:

Under the effect of sun rays striking said boiler the temperature of the water, contained in the boiler, rises and is transmitted to the liquid contained in tube C and membrane D.

As a result of the rise in temperature and the consecutive expansion of this liquid, the membrane D, containing same, is longitudinally lengthened, taking along with itself the axial rod E, which will butt against regulation screw L of valve H forcing the latter to open itself and to give free passage, by pipe N, to the warm water coming from the boiler under pressure. This water will right away flow towards the exterior through outlet O.

Inversely, as soon as the temperature of the water, contained in the boiler, goes down, the liquid and the membrane D, containing same, will shrink and force the valve to close itself under the action of spring J.

The adjustment of the outlet temperature of the water is produced by means of screw L. By unscrewing the latter, the distance, separating it from rod E, is increased or decreased. The greater this distance, the higher must be the temperature in the boiler, in order to get membrane D and rod E to move far enough so as to act upon said valve.

Having thus described my invention what I claim is:

1. A thermostatic regulating device for controlling the output of a solar boiler or heater of the "hollow-plate" type comprising at least one vat having inlet and outlet ducts, said regulating device comprising a body interposed in said outlet duct and secured to said vat, a rigid casing filled with an oily liquid having a high coefficient of thermal expansion, a collapsible bellows having a movable portion mounted within said body outside said casing, a port connecting said casing with said bellows, an axial push-rod mounted on the movable portion of the bellows, and a normally closed valve actuated from said push-rod so as to open the valve when the fluid of the solar heater has reached a predetermined temperature, said push-rod being guided within said port and being immersed in the oily liquid in the sectional plane of the port so as to prevent any wear resulting from the frictional engagement of said push-rod with the port side wall.

2. A thermostatic regulating device for controlling the output of a solar boiler or heater of the "hollow-plate" type comprising at least one vat having inlet and outlet ducts, said regulating device being interposed in said outlet duct and comprising a body secured to the vat, a distortable thermo-sensitive element partly immersed within the fluid in said vat and having a movable portion, an axial push-rod secured to the movable portion of said thermo-sensitive element, a valve interposed in the flow path of the fluid escaping from the vat and controlled from said push-rod, an axial rod rigid with said valve, a spring normally urging the valve towards its closed position, guiding means for said rod and a corrugated membrane forming a sleeve surrounding said rod, spring and guiding means for protecting the same from any contact with the fluid flowing from the solar boiler.

3. A thermostatic regulating device for controlling the output of a solar boiler or heater of the "hollow-plate" type comprising at least one vat having inlet and outlet ducts, said regulating device being interposed in said outlet duct and comprising a body secured to the vat, a rigid casing filled with an oily liquid having a high coefficient of thermal expansion and immersed in the fluid in said vat, a collapsible bellows having a movable portion and mounted within said body outside the bellows, a port establishing communication between said casing and said bellows so as to expand the same according to the temperature of the fluid in the vat, an axial push-rod guided in said port and secured to the movable portion of the bellows, said oily liquid preventing any wear due to a frictional contact of the push-rod with the port wall, a valve interposed in the outflow path of the fluid escaping from the boiler and controlled from said push-rod, an axial rod rigid with said valve, means for guiding said rod within said body, a spring normally urging said valve towards its closed position, and a corrugated membrane forming a sleeve surrounding said rod, spring and guiding means and shrouding the same from any contact with the fluid flowing out from the boiler.

4. A regulating device according to claim 3, comprising an axial adjusting screw engaged through the rod rigid with said valve, the position of said screw with respect to the valve being changeable for adjusting the temperature at which said valve is opened.

References Cited in the file of this patent

UNITED STATES PATENTS

| | | |
|---|---|---|
| 1,888,620 | Clark | Nov. 22, 1932 |
| 2,012,068 | McGoldrick | Aug. 20, 1935 |
| 2,475,556 | Seligman | July 5, 1949 |
| 2,553,073 | Barnett | May 15, 1951 |
| 2,553,302 | Cornwall | May 15, 1951 |